United States Patent [19]
Isomura

[11] Patent Number: 5,348,262
[45] Date of Patent: Sep. 20, 1994

[54] POWER SEAT SLIDE DEVICE

[75] Inventor: Tohru Isomura, Kanagawa, Japan

[73] Assignee: Ikeda Bussan Co., Ltd., Ayase, Japan

[21] Appl. No.: 122,665

[22] Filed: Sep. 17, 1993

Related U.S. Application Data

[63] Continuation of Ser. No. 708,703, May 31, 1991, Pat. No. 5,267,717.

[30] Foreign Application Priority Data

Sep. 26, 1990 [JP] Japan .............................. 2-100611[U]

[51] Int. Cl.⁵ .............................................. B60N 1/08
[52] U.S. Cl. ..................................... 248/430; 248/419
[58] Field of Search ............... 248/430, 429, 419, 420, 248/424

[56] References Cited

U.S. PATENT DOCUMENTS

| | | | |
|---|---|---|---|
| 2,014,553 | 9/1935 | Browne | 248/430 |
| 3,545,716 | 12/1970 | Colautti | 248/430 |
| 4,023,433 | 5/1977 | Schutz | 74/425 |
| 4,805,866 | 2/1989 | Aihara et al. | 248/429 |
| 4,863,289 | 9/1989 | Lecerf | 248/430 X |
| 4,907,776 | 3/1990 | Nemoto | 248/430 |
| 4,949,932 | 8/1990 | Terai | 248/430 |
| 5,048,886 | 9/1991 | Ito et al. | 296/65.1 |

FOREIGN PATENT DOCUMENTS 1349006 12/1963 France .

Primary Examiner—Alvin C. Chin-Shue
Attorney, Agent, or Firm—Foley & Lardner

[57] ABSTRACT

A seat slide device includes a stationary rail and a movable rail. The stationary rail has a first bottom wall portion, first inside wall portions vertically upwardly extending from side ends of the first bottom wall portion, upper wall portions outwardly extending from upper ends of the first inside wall portions, and first outside wall portions vertically downwardly extending from outer ends of the upper wall portions. Each of the upper wall portions is grooved at a major portion thereof for receiving ball bearings thereon and convexly curved at a rear end portion thereof. The major portion and the rear end portion are united. The movable rail is axially slidably engaged with the stationary rail and has an upper wall portion, second outside wall portions vertically downwardly extending from side ends of the upper wall portion, second bottom wall portions inwardly horizontally extending from lower ends of the second outside wall portions, and second inside wall portions vertically upwardly extending from inner ends of the second bottom wall portions. The stationary and movable rails are so assembled that each of the second inside wall portions of the movable rail is spacedly put between the corresponding first inside and outside wall portions of the stationary rail.

5 Claims, 2 Drawing Sheets

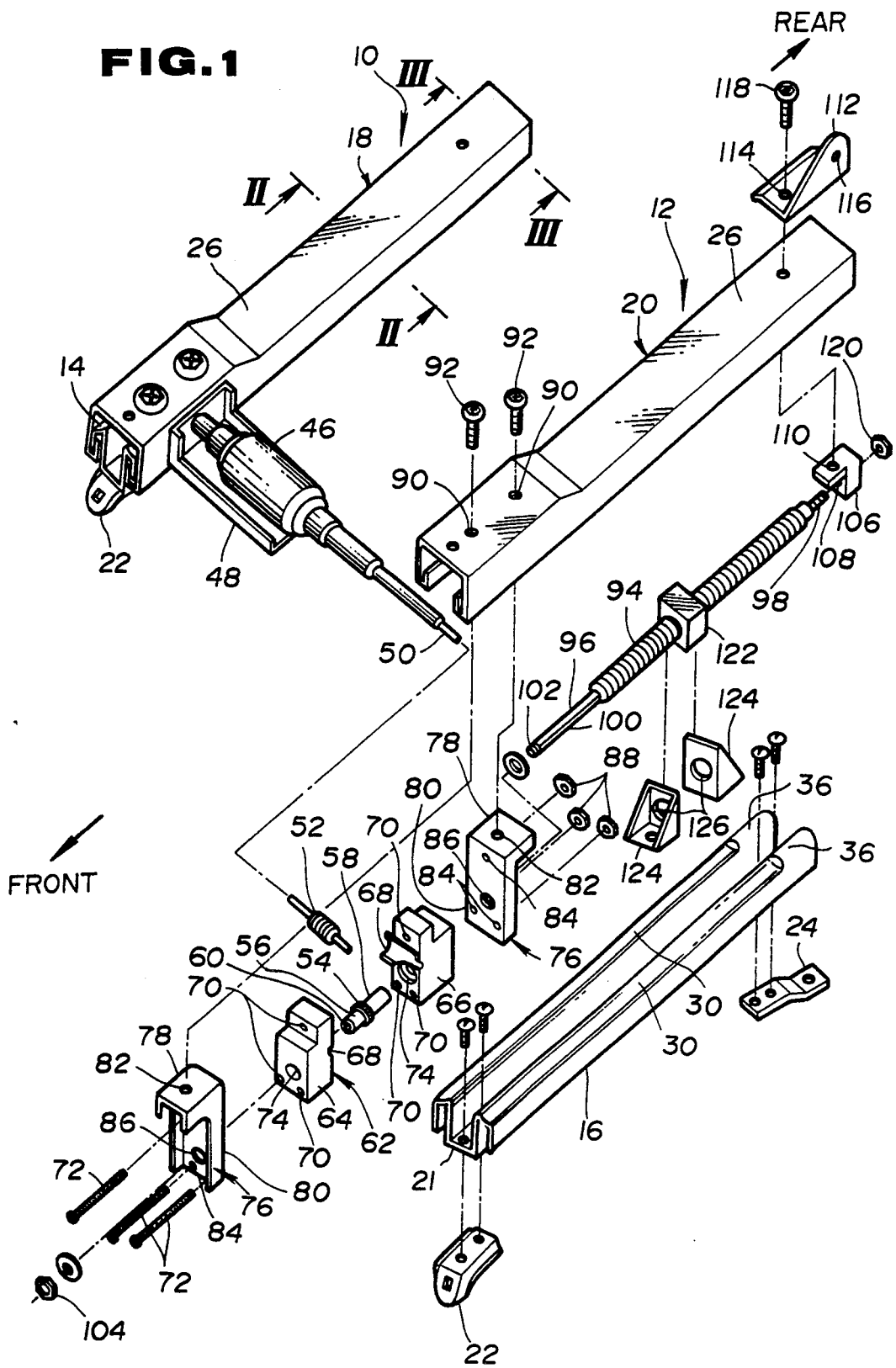

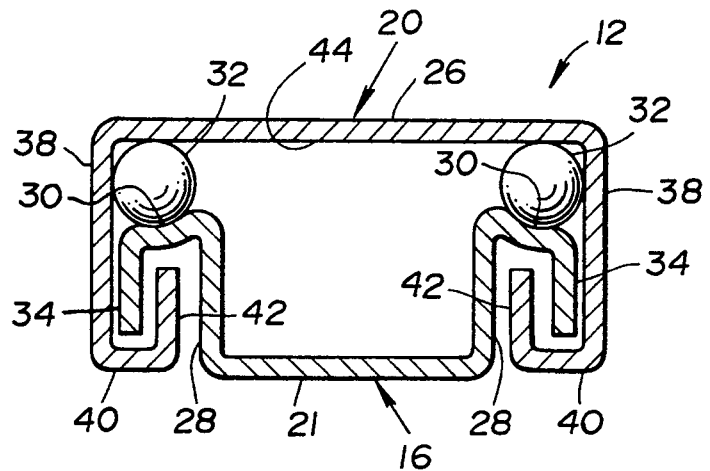
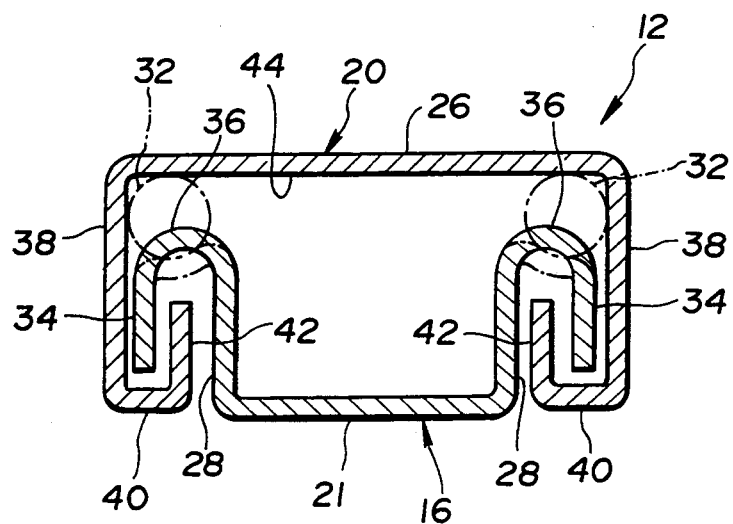
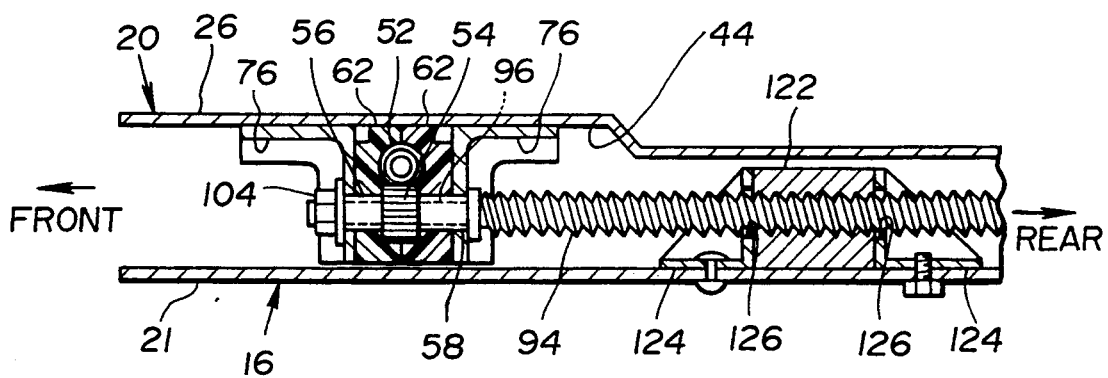

大宋5,348,262

POWER SEAT SLIDE DEVICE

This application is a continuation of application Ser. No. 07/708,703, filed May 31, 1991, U.S. Pat. No. 5,267,717 issued Dec. 7, 1993.

BACKGROUND OF THE INVENTION

1. Field of the Invention

The present invention relates in general to power seat slide devices for a motor vehicle, and more particularly to power seat slide devices of a type which includes a pair of parallel stationary rails fixed to a vehicular floor and a pair of parallel movable rails which mount thereon a seat and slidably engage with the stationary rails.

2. Description of the Prior Art

Hitherto, various power seat slide devices of the abovementioned type have been proposed. However, some of them have failed to exhibit a satisfied stoutness against a shock produced when the vehicle encounters a head-on collision or the like.

SUMMARY OF THE INVENTION

It is therefore an object of the present invention to provide a power seat slide device for a motor vehicle, which can exhibit a satisfied stoutness against the shock produced upon a head-on vehicle collision or the like. According to the present invention, there is provided a power seat slide device for a motor vehicle, in which, even upon heavy head-on vehicle collision and the like, the stationary and movable rails are prevented from being damaged.

According to the present invention, there is provided a seat slide device comprising: a stationary rail including a first bottom wall portion, first inside wall portions vertically upwardly extending from side ends of the first bottom wall portion, upper wall portions outwardly extending from upper ends of the first inside wall portions, and first outside wall portions vertically downwardly extending from outer ends of the upper wall portions, each of the upper wall portions being grooved at a major portion thereof for receiving ball bearings thereon and convexly curved at a rear end portion thereof, the major portion and the rear end portion being united; and a movable rail axially slidably engaged with the stationary rail, the movable rail including an upper wall portion, second outside wall portions vertically downwardly extending from side ends of the upper wall portion, second bottom wall portions inwardly horizontally s extending from lower ends of the second outside wall portions, and second inside wall portions vertically upwardly extending from inner ends of the second bottom wall portions, wherein the stationary and movable rails are so assembled that each of the second inside wall portions of the movable rail is spacedly put between the corresponding first inside and outside wall portions of the stationary rail.

BRIEF DESCRIPTION OF THE DRAWINGS

Other objects of the present invention will become apparent from the following description when taken in conjunction with the accompanying drawings, in which:

FIG. 1 is an exploded and perspective view of a power seat slide device of the present invention;

FIG. 2 is an enlarged sectional view taken from the direction of the arrow "II" of FIG. 1;

FIG. 3 is an enlarged sectional view taken from the direction of the arrow "III" of FIG. 1; and FIG. 4 is a vertically axially sectional and enlarged view of an essential part of the power seat slide device of the present invention.

DETAILED DESCRIPTION OF THE INVENTION

Referring to FIGS. 1 to 4, there is shown a power seat slide device according to the present invention.

As is seen from FIG. 1, the power seat slide device comprises a pair of (viz., right and left) parallel rail units 10 and 12, each including a stationary rail 14 or 16 and a movable rail 18 or 20. The parallel stationary rails 14 and 16 are fixed at front and rear portions of their bottom wall portions 21 to a vehicular floor (not shown) through front and rear brackets 22 and 24. The pair of parallel movable rails 18 and 20 mount thereon a seat (not shown) and slidably engage with the fixed stationary rails 14 and 16.

For facilitation of the description, the following explanation of the rail units 10 and 12 will be made only with respect to the left rail unit 12. The parts of the right rail unit 10 are substantially the same in construction and configuration as those of the left rail unit 12.

A front portion of an upper wall portion 26 of the movable rail 20 is somewhat raised for the purpose which will be described hereinafter.

As is seen from FIGS. 1, 2 and 3, the stationary rail 16 comprises an elongate major portion and a rear end portion which are united but different in configuration. This will be well understood from the following description.

That is, as is seen from FIGS. 1 and 2, the elongate major portion of the stationary rail 16 comprises the bottom wall portion 21 which is secured to the vehicular floor, inside wall portions 28 which extend vertically upwardly from side ends of the bottom wall portion 21, grooved upper wall portions 30 which extend outwardly from upper ends of the inside wall portions 28 for receiving ball bearings 32 thereon, and outside wall portions 34 which extend vertically downwardly from outer ends of the grooved upper wall portions 30.

As is seen from FIGS. 1 and 3, the rear end portion of the stationary rail 16 comprises the bottom wall portion 21, inside wall portions 28 which extend vertically upwardly from side ends of the bottom wall portion 21, convexly curved upper wall portions 36 which extend outwardly from upper ends of the inside wall portions 28, and outside wall portions 34 which extend vertically downwardly from outer ends of the convexly curved wall portions 36.

Thus, there is a difference in level between each grooved upper wall portion 30 and the corresponding convex upper wall portion 36.

As is seen from FIGS. 1, 2 and 3, the movable rail 20 comprises an upper wall portion 26 which mounts thereon the seat, outside wall portions 38 which extend vertically downwardly from side ends of the upper wall portion 26, bottom wall portions 40 which extend inwardly horizontally from lower ends of the outside wall portions 38, and inside wall portions 42 which extend vertically upwardly from inner ends of the bottom wall portions 40.

The stationary and movable rails 16 and 20 are so assembled that each of the inside wall portions 42 of the movable rail 20 is spacedly put between the corresponding inside and outside wall portions 28 and 34 of the stationary rail 16.

As is seen from FIG. 2, the ball bearings 32 are rotatably received in a space which is defined by the upper wall portion 26 and the outside wall portions 38 of the movable rail 20 and the grooved upper wall portions 30 of the stationary rail 16, so that the movable rail 20 is smoothly slidable on and along the stationary rail 16.

An elongate tunnel-like rectangular space 44 is thus defined by and between the slidably engaged stationary and movable rails 16 and 20, as is seen from FIGS. 2, 3 and 4.

As is seen from FIG. 1, an electric motor 46 is mounted on the movable rail 18 of the right rail unit 10 through a bracket 48. The electric motor 46 has a drive shaft 50 passing therethrough, and the drive shaft 50 has a leading end which is secured to a worm 52. Operatively engaged with the worm 52 is a worm wheel 54 which has front and rear cylindrical portions 56 and 58 which extend forwardly and rearwardly therefrom, respectively. The worm wheel 54 has a rectangular through hole 60 formed therein which extends from a front end of the front cylindrical portion 56 to a rear end of the rear cylindrical portion 58. The worm 52 and the worm wheel 54 are housed in a gear housing 62.

The gear housing 62 is constructed of plastics and comprises front and rear half portions 64 and 66. The rear half portion 66 has at its front surface a laterally extending semicylindrical groove 68 for rotatably receiving the worm 52, at its upper middle and lower side end portions axially extending bolt holes 70 for receiving bolts 72, and at a lower middle portion an axially extending through bore 74 for rotatably receiving the rear cylindrical portion 58 of the worm wheel 54. The front half portion 64 of the gear housing 62 is substantially the same in construction as the rear half portion 66. The front and rear half portions 64 and 66 of the gear housing 62 are mated with each other so as to rotatably support the worm 52 and the worm wheel 54 therein. With this, the bolt holes 70 of the front half portion 64 of the gear housing 62 and those of the rear half portion 66 are mated with each other.

A pair of L-shaped holders 76 are used for connecting the gear housing 62 to the movable rail 20. They have respectively horizontal upper wall portions 78 and vertical wall portions 80. Each holder 76 has at the upper wall portion 78 a through hole 82 and a nut (not shown) which is welded to a lower surface of the upper wall portion 78 and mated with the through hole 82, at an upper middle portion and lower side portions of the vertical wall portion 80 bolt holes 84, and at a lower middle portion of the vertical wall portion 80 a through bore 86 for receiving the cylindrical portion 56 or 58 of the worm wheel 54.

As is seen from FIG. 4, the gear housing 62 and the holders 76 are placed under the aforementioned raised front portion of the upper wall portion 26 of the movable rail 20. The upper surface of the gear housing 62 and that of each holder 76 are in abutment with a lower surface of the raised upper wall portion 26 of the movable rail 20.

As is seen from FIG. 1, the holders 76 are arranged to put therebetween the gear housing 62 in such a manner that the bolt holes 84 and the through bores 86 of the holders 76 are mated with the bolt holes 70 and the through bores 74 of the gear housing 62, respectively. The bolts 72 are inserted into the bolt holes 84 and 70 of the holders 76 and the gear housing 62 respectively and threadedly engaged with nuts 88 to fix the gear housing 62 between the holders 76. If desired, a monolithic holder may be employed for holding the gear housing 62.

The through holes 82 of the holders 76 are mated with through holes 90 formed in the movable rail 20. Bolts 92 are inserted into the through holes 90 of the movable rail 20 and the through holes 82 of the holders 76, and threadedly engaged with the welded nuts of the holders 76. With this, the holders 76 are secured to the movable rail 20 having the gear housing 62 tightly disposed therebetween.

A threaded shaft 94 has front and rear thinner portions 96 and 98. The front thinner portion 96 has a rectangular portion 100 and at its front end a threaded portion 102. The rear thinner portion 98 is threaded. The threaded shaft 94 extends in and along the above-mentioned tunnel-like space 44 (see FIG.4) defined by and between the stationary and movable rails 16 and 20. The front thinner portion 96 is received in a rectangular through hole 60 of the worm wheel 54 in such a manner that the rectangular portion 100 of the threaded shaft 94 becomes fitted in the rectangular through hole 60 of the worm wheel 54 to achieve integral rotation therebetween. The threaded portion 102 is exposed from the bore 86 of the holder 76. A nut 104 is engaged with the threaded portion 102.

An L-shaped shaft holder 106 has at its vertical and horizontal portions through holes 108 and 110, respectively.

A seat belt anchor bracket 112 has at its horizontal portion a through hole 114 and at its vertical portion a through hole 116 for connecting a seat belt anchor (not shown). The bracket 112 and the shaft holder 106 are secured to the upper wall portion 26 of the movable rail 20 by a common bolt 118. The rear thinner portion 98 of the threaded shaft 94 is rotatably received in the through hole 108 of the shaft holder 106 and threadedly engaged with a nut 120.

A nut 122 is generally rectangular in shape and placed on the upper surface of the bottom wall portion 21 of the stationary rail 16. The nut 122 is put between a pair of nut holders 124 which are secured to the bottom wall portion 21 of the stationary rail 16. Therefore, the nut 122 is not movable in a fore-and-aft direction relative to the stationary rail 16. Rotation of the nut 122 about the threaded shaft 94 is suppressed because side walls of the nut 122 are in abutment with the inside wall portions 28 of the stationary rail 16. The threaded shaft 94 passes through through holes 126 of the nut holders 124 and is operatively engaged with the nut 122.

In the following, operation of the power seat slide device of the invention will be described. The description will be commenced with respect to a condition wherein the seat, viz., the movable rail 20 fixed thereto, assumes its rearmost position.

Under this condition, the electric motor 46 is at its standstill and the seat is substantially locked at the rearmost position due to the nature of the meshed engagement between the fixed nut 122 and the threaded shaft 94. That is, under this condition, relative movement between the threaded shaft 94 supported by the movable rail 20 and the nut 122 secured to the stationary rail 16 is not permitted. Even when, by for example a passenger seated on the seat, a certain force is suddenly applied to the threaded shaft 94 in a direction parallel with the axis of the threaded shaft 94, the meshed engagement between the nut 122 and the threaded shaft 94 prevents the threaded shaft 94 from making a movement relative to the fixed nut 122.

When now the motor 46 is energized to rotate in a given direction, the power of the drive shaft 50 of the motor 46 is transmitted through the worm 52 and the worm wheel 54 to the threaded shaft 94 thereby rotating the same about its axis. With this rotation, the threaded shaft 94 advances forward relative to the fixed nut 122, and thus the movable rail 20 carrying the threaded shaft 94 is moved forward relative to the stationary rail 16. This means that the seat is moved forward.

When the seat comes to a desired position, the electric motor 46 is deenergized. With this, the seat is stationarily placed or locked at the desired new position.

An advantage of the power seat slide of the present invention will be described in the following.

In case of head-on vehicle collision and the like, the seat is applied with a great inertial force in a direction to move forward relative to the stationary rail 16 causing a rear portion of the movable rail 20 to be lifted. Therefore, as will be understood from FIG. 3, the bottom wall portions 40 of the rear portion of the movable rail 20 are pressed against the lower ends of the outside wall portions 34 of the stationary rail 16. Thus, a great force is applied to the rear end portion of the stationary rail 16. However, stress caused by this force does not concentrate at the rear end portion of the stationary rail 16 because of presence of the convexly curved upper wall portions 36 at the rear end of the stationary rail 16. In fact, the portions 36 are not sharply bent and thus do not have a portion at which the stress is concentrated. Therefore, even in case of heavy head-on collision and the like, stress concentration does not occur at the stationary rail 16, and thus the stationary rail 16 is not damaged.

What is claimed is:

1. A seat slide device comprising:
   a stationary rail including
      a first bottom wall portion, first and second inside wall portions vertically upwardly extending from respective side ends of said first bottom wall portion, first and second upper wall portions outwardly extending from upper ends of said first and second inside wall portions, respectively, and first and second outside wall portions vertically downwardly extending from outer ends of said first and second upper wall portions, respectively,
      each of said first and second upper wall portions being grooved at a major portion thereof for receiving ball bearings thereon and being convexly curved at a rear end portion thereof in a plane perpendicular to a longitudinal axis of said stationary rail, said major portion and said rear end portion being united,
      said rear end portion being higher than said major portion such that said rear end portion overlaps with one of said ball bearings with respect to a direction along said longitudinal axis of said stationary rail and serves as a stopper of the sliding movement of said one of said ball bearings on said major portion;
   a movable rail axially slidably engaged with said stationary rail, said movable rail including
      an upper wall portion, first and second movable rail outside wall portions vertically downwardly extending from respective side ends of said upper wall portion, first and second movable rail bottom wall portions inwardly horizontally extending from lower ends of said first and second movable rail outside wall portions, respectively, and first and second movable rail inside wall portions vertically upwardly extending from inner ends of said first and second movable rail bottom wall portions, respectively;
   a front bracket secured to a front end portion of said bottom wall portion of said stationary rail; and
   a rear bracket secured to a rear end portion of said bottom wall portion of said stationary rail through at least one bolt;
   wherein said stationary and movable rails are so assembled that said first movable rail inside wall portion is disposed between said first inside wall portion of said stationary rail and said first outside wall portion of said stationary rail, and said second movable rail inside wall portion is disposed between said second inside wall portion of said stationary rail and said second outside wall portion of said stationary rail;
   wherein a front end of said convexly curved rear end portion is positioned ahead of said at least one bolt with respect to said direction along said longitudinal axis of said stationary rail.

2. A seat slide device as claimed in claim 1, in which said movable rail and said stationary rail are assembled to define therebetween an elongate tunnel which extends along a common axis of said stationary and movable rails;

3. A seat slide device as claimed in claim 2, further comprising:
   a threaded shaft housed in said elongate tunnel and having both ends rotatably supported by one of said stationary and movable rails;
   a nut received in said elongate tunnel and fixed to the other of said stationary and movable rails, said threaded shaft being operatively engaged with said nut so that rotation of said threaded shaft about its axis induces a longitudinal movement of said movable rail relative to said stationary rail;
   a drive device mounted on the rail by which said threaded shaft is supported, said drive device having a drive shaft;
   a gear mechanism arranged between said drive shaft and said threaded shaft for transmitting a power of said drive shaft to said threaded shaft;
   a gear housing for housing therein said gear mechanism; and
   a pair of holders secured to the rail by which said threaded shaft is supported, said holders putting said gear housing therebetween.

4. A seat slide device as claimed in claim 3, in which said threaded shaft is supported by said movable rail, and said nut is fixed to said stationary rail.

5. A seat slide device as claimed in claim 4, in which said gear housing is made of plastic.

* * * * *